United States Patent
Cuypers et al.

(10) Patent No.: US 7,197,199 B2
(45) Date of Patent: Mar. 27, 2007

(54) CALIBRATION AND MEASUREMENT OF TEMPERATURES IN MELTS BY OPTICAL FIBERS

(75) Inventors: Jan Cuypers, Brüssels (BE); Marc Straetemans, Hechtel-Eksel (BE)

(73) Assignee: Heraeus Electro-Nite International N.V., Houthalen (BE)

( * ) Notice: Subject to any disclaimer, the term of this patent is extended or adjusted under 35 U.S.C. 154(b) by 0 days.

(21) Appl. No.: 11/326,775

(22) Filed: Jan. 6, 2006

(65) Prior Publication Data

US 2006/0115205 A1 Jun. 1, 2006

Related U.S. Application Data

(63) Continuation of application No. PCT/EP04/06828, filed on Jun. 24, 2004.

(30) Foreign Application Priority Data

Jul. 9, 2003 (DE) ................ 103 31 125

(51) Int. Cl.
*G02B 6/00* (2006.01)
(52) U.S. Cl. ...................................... 385/12
(58) Field of Classification Search ............. 385/12–13
See application file for complete search history.

(56) References Cited

U.S. PATENT DOCUMENTS

| | | |
|---|---|---|
| 3,499,310 A | 3/1970 | Hundere et al. |
| 4,576,486 A | 3/1986 | Dils |
| 5,364,186 A | 11/1994 | Wang et al. |
| 5,582,170 A * | 12/1996 | Soller .................... 600/322 |
| 5,882,936 A * | 3/1999 | Bentsen et al. ............ 436/68 |
| 6,227,702 B1 | 5/2001 | Yamada et al. |
| 2003/0219190 A1* | 11/2003 | Pruett ..................... 385/12 |

FOREIGN PATENT DOCUMENTS

| | | |
|---|---|---|
| DE | 27 58 084 A1 | 6/1979 |
| DE | 44 33 685 A1 | 3/1996 |
| DE | 195 32 077 A1 | 3/1997 |
| DE | 199 34 299 A1 | 2/2000 |
| GB | 2 155 238 A | 9/1985 |
| JP | 63125906 A | 5/1988 |

OTHER PUBLICATIONS

Ewan, B.C.R., "A Study of Two Optical Fibre Probe Designs for Use in High-Temperature Combustion Gases", Meas. Sci. Technol., vol. 9, No. 8, pp. 1330-1335 (1998).

* cited by examiner

*Primary Examiner*—Kevin S. Wood
(74) *Attorney, Agent, or Firm*—Akin Gump Strauss Hauer & Feld L.L.P.

(57) ABSTRACT

A method is provided for calibrating measurement signals obtained with optical fibers, wherein a reference material having a known reference temperature is arranged at one end of an optical fiber, the reference material is heated up to at least its reference temperature, the signal received by the fiber when the reference temperature is reached is supplied as a calibration signal to a measurement device and is compared there with the theoretical value for the reference temperature, and the difference is used for calibration. In addition, a corresponding device is provided for using the above method for calibration or determination of the attenuation of an optical fiber.

16 Claims, 3 Drawing Sheets

CALIBRATION AND MEASUREMENT OF TEMPERATURES IN MELTS BY OPTICAL FIBERS

CROSS-REFERENCE TO RELATED APPLICATIONS

This application is a continuation of International Application No. PCT/EP2004/006828, filed Jun. 24, 2004, which was published in the German language on Jan. 20, 2005, under International Publication No. WO 2005/005946 A1 and the disclosure of which is incorporated herein by reference.

BACKGROUND OF THE INVENTION

The invention relates to a method for calibrating measurement signals, which are obtained with optical fibers, and also to a corresponding measurement device. In addition, the invention relates to a method for measuring the temperature in molten masses (melts) by optical fibers, as well as to a measurement device and its use. Here, melts are understood to be both melts of pure metals, such as iron, copper, steel, or alloys, and also cryolite melts, salt melts, or glass melts.

Such devices are known, for example, from German published patent application DE 199 34 299 A1. There, a radiation detector is used for calibrating a measurement system, and a second radiation detector is used for measuring radiation emitted by a radiation source.

The calibration of temperature sensors is known, for example, from British published patent application GB 2 155 238 A and from German published patent application DE 195 32 077 A1. There, a reference material insulated from a thermoelement tip is used for calibration. This is necessary in order to guarantee problem-free functioning of the thermoelement and to prevent its destruction. Such destructive effects are described, for example, in U.S. Pat. No. 3,499,310. There, it is disclosed explicitly that the thermoelement is protected from chemical reactions with the reference material, for example, by a coating.

Other devices are disclosed, for example, in Japanese published patent application JP 63-125906, and in U.S. Pat. Nos. 4,576,486, and 5,364,186.

BRIEF SUMMARY OF THE INVENTION

An object of the present invention is to design an improved method for equilibration of measurement signals and a corresponding device for performing the method, which have a simple and reliable function.

According to the invention, the above object is achieved for the method by arranging a reference material with a known reference temperature at one end of an optical fiber, heating the reference material up to at least its reference temperature, feeding the signal received by the fiber, when the reference temperature is reached, as a calibration signal to a measurement device and there comparing the signal with the theoretical value for the reference temperature, and using the difference for calibration. In particular, the end of the optical fiber with the reference material can be immersed in a molten metal, for example, a molten iron or steel, and heated there. In principle, the signal reception proceeds in a known way, wherein particularly, the calibration signal is converted as a value of an electrical voltage into a temperature value and then compared with the theoretical value for the reference temperature. Here, the reference material is arranged directly at the end of the optical fiber, that is, without the insulation arrangements between the fiber and the reference material, which are necessary according to the prior art.

The temperature measurement method according to the invention comprises, after or during a calibration process according to the invention, immersing the optical fiber in the melt and evaluating the obtained optical signal as the value of the temperature of the melt. Due to the closeness in time to the calibration, a high degree of accuracy of the temperature measurement is possible. Before each temperature measurement, calibration is possible without additional expense. In particular, it is advantageous that the reference temperature of the reference material be less than the melting-point temperature of the melt. It is further useful that the reference material be immersed in the melt to be measured and there be heated up to the reference temperature of the reference material, and thereafter the temperature of the melt is measured.

It is advantageous that quartz glass and/or sapphire be used as the optical fiber, because in this way, a measurement can be performed in melts at high temperatures. In addition, it is useful that a combination of a plastic fiber and/or a quartz-glass fiber with sapphire be used as the optical fiber. The combination of a plastic fiber with quartz glass is also possible.

To prevent undercooling of the melt, e.g., during cooling down, the end of the fiber in contact with the reference material can be set in vibration. The vibration is performed at least intermittently, preferably during cooling down of the melt.

The method according to the invention can be used for calibration or for determination of the attenuation of the optical fiber.

The reference temperature can be the melting-point temperature of a pure metal, if such a material is used as the reference material. For the use of alloys as the reference material, the liquidus temperature, the solidus temperature, or the eutectic point, for example, can be used as the reference temperature. According to Plank's law, it is possible to extrapolate calibration curves over greater than 500° C. For example, the calibration with silver as a reference material can thus be realized at a temperature of 961.8° C., whereby high degrees of accuracy can be reached even for measurements in molten iron at approximately 1550° C.

According to the invention, the device for equilibration of measurement signals has an optical fiber, a carrier for the fiber, and a measurement device connected to the optical fiber for receiving a signal output from the optical fiber, and is characterized in that a reference material with a known reference temperature is arranged (directly) at one end of the optical fiber, and in that the measurement device has a comparator for the signal received from the fiber at the reference temperature of the reference material and supplied to the measurement device as a calibration signal and for a signal corresponding to the theoretical value for the reference temperature, and an evaluation unit is provided for the output and/or processing of the difference for calibration. By the direct arrangement of the reference material at the end of the optical fiber, a high degree of accuracy of the measurement can be achieved with a simple construction.

The above object is achieved for a device for measuring a temperature in melts with optical fibers, in that an equilibration device according to the invention has an immersion end for immersion of the optical fiber in the melt and an evaluation unit for evaluation of the received optical and/or electrical signal as a value for the temperature.

For the devices, it is useful that the reference material at least partially cover the end of the optical fiber at least at its end face and/or that the reference material be arranged along the end of the optical fiber, because in this way, an optimal signal reception is enabled. It is further useful that the end of the optical fiber have at least partially a free surface for receiving radiation. In particular, it is advantageous that the reference material be formed as a compact mass, as a wire, as a wire mesh, or as a tube, and that the optical fiber be formed from quartz glass and/or sapphire. In addition, it can be advantageous that the optical fiber have a combination of a plastic fiber and/or a quartz glass fiber. The combination of a plastic fiber with quartz glass is also possible.

To prevent undercooling of the melt, a vibrator is provided on the optical fiber or its carrier or the fiber guide. The fiber, especially its end in contact with the reference material, can be vibrated with this vibrator.

According to the invention, the device is used for calibration or for determination of the attenuation (thus the propagation losses) of an optical fiber. The term equilibration in this case means calibration or determination of attenuation.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
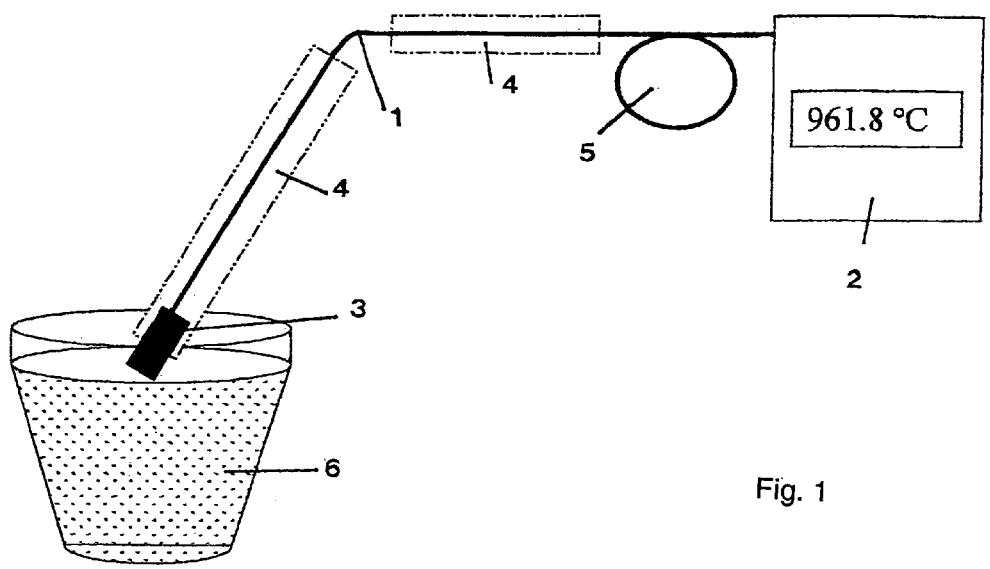
FIG. 1 is a schematic side view of a measurement arrangement according to the invention.

As shown in FIG. 1, an optical fiber 1 is connected at one end to a measurement device 2. The carrier tube 4 can comprise paperboard or another material, such as steel or ceramic. The measurement device 2 detects the signals led outwardly by the optical fiber 1 and is equipped to compare a signal with a theoretical reference value. In this way, a value generated from a reference material 3, which is arranged at the other end of the optical fiber 1, is compared with a theoretical reference value, for example the reference temperature, stored in the measurement device 2. A possible difference between the two values is used for calibrating the measurement device. Accordingly, the measurement device 2 includes an evaluation unit for output and/or processing of the data. In the case where a pure metal, for example silver, is used as the reference material 3, the melting-point temperature of the metal, for example of silver with 961.8° C., is used as the reference temperature.

The optical fiber 1 is held by a carrier tube 4 and is guided by this carrier. For a freely movable optical fiber 1, it is fed in a loop 5 to the measurement device 2. The reference material 3 arranged at one end of the optical fiber 1 is immersed in a molten metal 6 (for example within a smelting furnace). The molten metal 6 is, for example, molten iron or steel. The reference material 3 is in this case, for example, silver. The reference temperature is the melting-point temperature of the silver. It is less than the melting-point temperature of the molten iron or steel. The end of the optical fiber 1 with the reference material 3 is immersed in the molten metal 6 with the help of the carrier 4. There, the reference material 3 is first heated to its melting-point temperature. In this way, the signal supplied through the optical fiber 1 to the measurement device 2 is compared with the corresponding theoretical signal value and in this way calibrates the measurement device 2.

After the melting of the reference material 3, this heats up further to the actual melting-point temperature of the molten metal 6. The signal led in this way by the optical fiber 1 to the measurement device 2 is evaluated, for example converted into an electric value corresponding to a temperature, and further processed in the measurement device 2. The electric signal can be converted into an optically displayed temperature value. In this way, the measurement device 2 is first calibrated and then the actual temperature of the molten metal 6 is measured.

Figure 4:
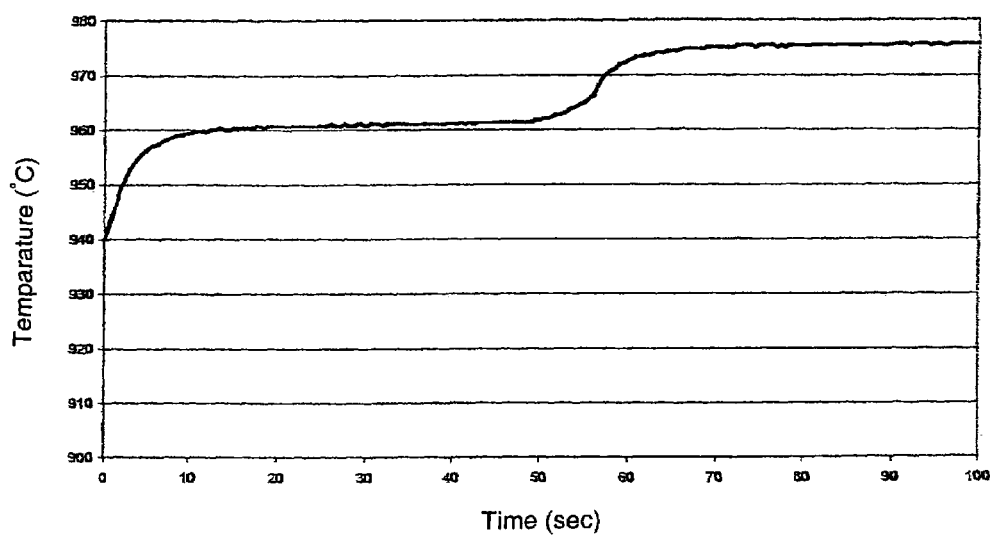
FIG. 4 is a measurement profile plotting temperature over time with a method and device according to the invention.

In FIG. 4 the temperature profile is plotted during these successive processing steps. Here, the first plateau value that is reached represents the melting-point temperature of the reference material 3 (silver), and the next plateau value represents the temperature of the molten metal 6. A vibration device (not shown in the Figures) is arranged rigidly on the carrier 4. Such vibration devices are known, for example, from German published patent application DE 44 33 685 A1.

Figure 2:
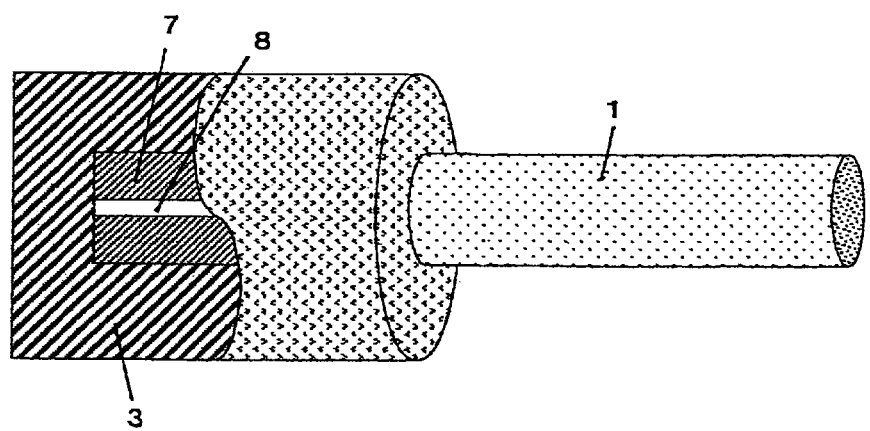
FIG. 2 is a detailed cross sectional, perspective view through the optical fiber.

FIG. 2 shows a cross section through the end of the optical fiber 1 intended for immersion in a molten metal. The optical fiber 1 has a sleeve (cladding) 7 and a core 8. At its end, the optical fiber 1 is surrounded both laterally and on its end face by the reference material 3. The reference material 3 is held in a manner commonly known to the person skilled in the art.

Figure 3:
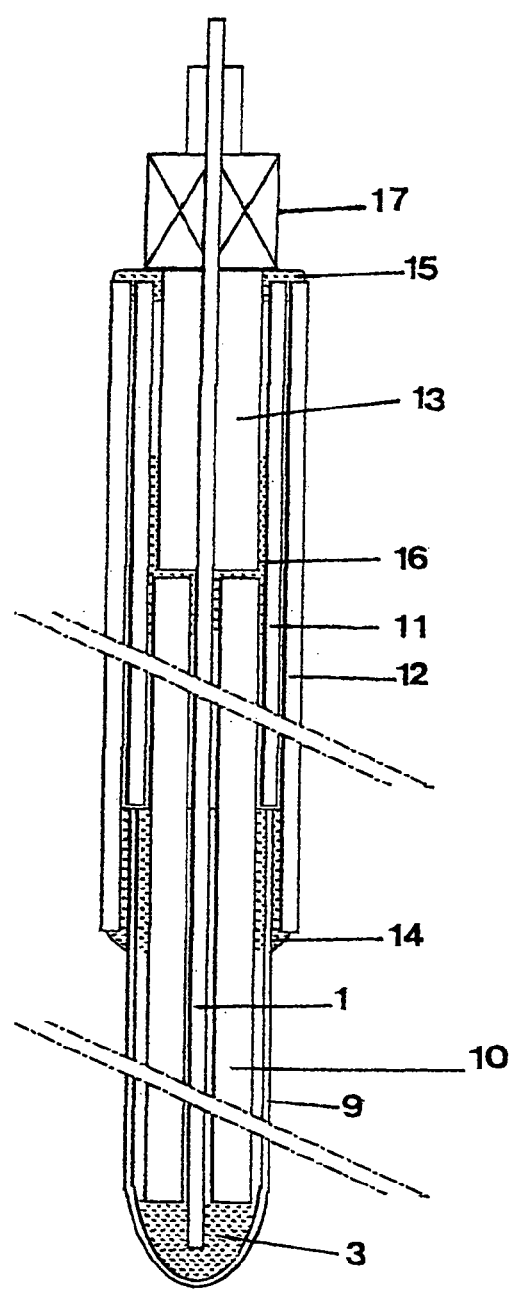
FIG. 3 is a truncated, longitudinal, cross sectional view through the immersion end of a measurement or calibration device according to the invention.

The holding of the reference material 3 on the optical fiber 1 is realized, for example, in the manner shown in FIG. 3, within a quartz tube 9, which is closed on one end and which surrounds the immersion end of the optical fiber 1 with the reference material 3. The optical fiber 1 is here guided through a ceramic tube 10, for example Alsint. The ceramic tube 10 is fixed by a cement 14, for example $LiSiO_2$ cement, in two further ceramic tubes 11; 12 arranged concentrically. These ceramic tubes can also be formed from Alsint. The ceramic tubes 10; 11; 12 are fixed on a contact block 13, through which the optical fiber 1 is guided.

The contact block 13 is connected to the carrier tube 4 (not shown in FIG. 3). Here, the ceramic tube 12 is fixed in the open end of the carrier tube 4, for example by means of cement. The openings on the end of the ceramic tube 12 are closed with cement 14; 15. Within the ceramic tube 11, cement 16 can also be used for fixing the elements located therein. The contact block 13 with its connecting piece 17 serves, among other things, also as an optical connection.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for calibration of measurement signals and for measuring a temperature in a melt by optical fibers, comprising the steps of arranging a reference material with a known reference temperature at one end of an optical fiber, immersing the optical fiber with the reference material at the one end in the melt to be measured to heat the reference material up to at least its reference temperature, wherein the reference temperature of the reference material is less than a melting-point temperature of the melt to be measured, feeding a signal received by the fiber when the reference temperature is reached as a calibration signal to a measurement device, comparing the signal with a theoretical value for the reference temperature in the measurement device, using any difference from the comparison for calibration, and after the calibration maintaining the optical fiber immersed in the melt to be measured and evaluating an obtained optical and/or electrical signal as a value of the temperature of the melt.

2. The method according to claim 1, wherein the comparison step comprises converting the calibration signal as a value of an electric voltage into a temperature value and thereafter comparing the temperature value with the theoretical value for the reference temperature.

3. The method according to claim 1, wherein as the optical fiber comprises quartz glass or sapphire.

4. The method according to claim 1, wherein the optical fiber comprises a combination of sapphire with at least one of a plastic fiber and a quartz-glass fiber.

5. The method according to claim 1, further comprising setting the end of the optical fiber into vibration at least intermittently.

6. The method according to claim 1, wherein the calibration comprises determining attenuation of the optical fiber.

7. A device for equilibration of measurement signals and for measuring a temperature in a melt by optical fibers, comprising an optical fiber (1), a carrier (4) for the fiber, a measurement device (2) connected to a first end of the optical fiber for receiving a signal emitted by the optical fiber, a reference material (3) having a known reference temperature arranged at a second end of the optical fiber (1), the measurement device (2) having a comparator for the signal received by the fiber (1) at the reference temperature of the reference material (3) and supplied to the measurement device (2) as a calibration signal and for a signal corresponding to a theoretical value for the reference temperature, an evaluation unit for output and/or processing of a difference from the comparator for calibration and a further evaluation unit for evaluating a received optical and/or electrical signal as a value for the temperature, wherein the first end of the optical fiber (1) is configured for immersion in the melt.

8. The device according to claim 7, wherein the reference material (3) at least partially covers the first end of the optical fiber (1) at least at one of its end face and laterally along the first end of the optical fiber (1).

9. The device according to claim 7, wherein the first end of the optical fiber (1) has at least partially a free surface.

10. The device according to claim 7, wherein the reference material (3) has a form selected from a compact mass, a wire, a wire mesh, and a tube.

11. The device according to claim 7, wherein the optical fiber (1) comprises quartz glass or sapphire.

12. The device according to claim 7, wherein the optical fiber (1) comprises a combination of sapphire with at least one of a plastic fiber and a quartz-glass fiber.

13. The device according to claim 7, wherein the optical fiber is connected to a vibrator.

14. The device according to claim 7, wherein the comparator is adapted for determination of attenuation of the optical fiber.

15. A method for calibration of measurement signals obtained with optical fibers, comprising the steps of arranging a reference material with a known reference temperature at one end of an optical fiber, heating the reference material up to at least its reference temperature, feeding a signal received by the fiber when the reference temperature is reached as a calibration signal to a measurement device, comparing the signal with a theoretical value for the reference temperature in the measurement device, using any difference from the comparison for calibration, and further comprising setting the end of the optical fiber into vibration at least intermittently.

16. A device for equilibration of measurement signals, comprising an optical fiber (1), a carrier (4) for the fiber, a measurement device (2) connected to a first end of the optical fiber for receiving a signal emitted by the optical fiber, a reference material (3) having a known reference temperature arranged at a second end of the optical fiber (1), the measurement device (2) having a comparator for the signal received by the fiber (1) at the reference temperature of the reference material (3) and supplied to the measurement device (2) as a calibration signal and for a signal corresponding to a theoretical value for the reference temperature, and an evaluation unit for output and/or processing of a difference from the comparator for calibration, wherein the optical fiber is connected to a vibrator.

* * * * *

UNITED STATES PATENT AND TRADEMARK OFFICE
CERTIFICATE OF CORRECTION

| | | |
|---|---|---|
| PATENT NO. | : 7,197,199 B2 | Page 1 of 1 |
| APPLICATION NO. | : 11/326775 | |
| DATED | : March 27, 2007 | |
| INVENTOR(S) | : Jan Cuypers and Marc Straetemans | |

It is certified that error appears in the above-identified patent and that said Letters Patent is hereby corrected as shown below:

At column 5, line 51 and column 6, lines 2, 4 and 5:

"first end" should read -- second end --.

Signed and Sealed this
Eighth Day of March, 2011

David J. Kappos
*Director of the United States Patent and Trademark Office*